(12) United States Patent
Nasiatka et al.

(10) Patent No.: US 10,322,831 B2
(45) Date of Patent: Jun. 18, 2019

(54) REDUCED POWER CONSUMPTION SEALING TOOL FOR STRAP

(71) Applicant: Signode Industrial Group LLC, Glenview, IL (US)

(72) Inventors: Jason R. Nasiatka, Northbrook, IL (US); Janusz Figiel, Mundelein, IL (US)

(73) Assignee: SIGNODE INDUSTRIAL GROUP LLC, Glenview, IL (US)

(*) Notice: Subject to any disclaimer, the term of this patent is extended or adjusted under 35 U.S.C. 154(b) by 1090 days.

(21) Appl. No.: 14/689,471

(22) Filed: Apr. 17, 2015

(65) Prior Publication Data

US 2015/0321777 A1   Nov. 12, 2015

Related U.S. Application Data

(60) Provisional application No. 61/991,808, filed on May 12, 2014.

(51) Int. Cl.
| | | |
|---|---|---|
| B65B 13/30 | (2006.01) | |
| B65B 13/18 | (2006.01) | |
| B65B 13/34 | (2006.01) | |
| B65B 57/08 | (2006.01) | |

(52) U.S. Cl.
CPC ............ B65B 13/187 (2013.01); B65B 13/30 (2013.01); B65B 13/345 (2013.01); B65B 57/08 (2013.01); *Y10T 403/58* (2015.01)

(58) Field of Classification Search
CPC ..... B65B 13/30; B65B 13/187; B65B 13/345; B65B 13/185; B65B 57/08; Y10T 403/58
USPC ...................... 140/150, 152; 403/315; 100/30
See application file for complete search history.

(56) References Cited

U.S. PATENT DOCUMENTS

| | | | |
|---|---|---|---|
| 1,891,239 A | 12/1932 | Ekern | |
| 1,984,652 A | 12/1934 | Ekern | |
| 3,211,186 A * | 10/1965 | Bushman | ............. B65B 13/345 140/93.4 |

(Continued)

FOREIGN PATENT DOCUMENTS

| | | |
|---|---|---|
| CN | 1330017 A | 1/2002 |
| CN | 2813452 Y | 9/2006 |
| CN | 201172485 Y | 12/2008 |

OTHER PUBLICATIONS

Invitation to Pay Fees and Communication Relating to the Results of the Partial International Search for PCT/US2015/026655 dated Jul. 24, 2015.

(Continued)

*Primary Examiner* — Jimmy T Nugyen
(74) *Attorney, Agent, or Firm* — Levenfeld Pearlstein, LLC (57) ABSTRACT

A sealing tool for forming a joint in a seal positioned on overlying courses of strap includes a body, a motor and drive train housed, at least in part, in the body, a power supply and a sealing assembly mounted to the body. The sealing assembly is operably coupled to the motor. The sealing assembly includes at least one jaw having a pair of opposing jaw elements. Each jaw element has two edges for cutting into the seal and the courses of strap and forming a bent tab. The jaw element edges are configured to cut into the seal and the courses of strap material at different distances into a width of the seal and strap material. A method for forming seal and a seal formed by the tool and method are disclosed.

14 Claims, 11 Drawing Sheets

(56) References Cited

U.S. PATENT DOCUMENTS

| | | | | |
|---|---|---|---|---|
| 3,769,859 A | * | 11/1973 | Sykes | ............ B65B 13/345 |
| | | | | 140/150 |
| 4,245,678 A | * | 1/1981 | Sansum | ............ B65B 13/345 |
| | | | | 100/30 |
| 6,422,272 B1 | | 7/2002 | Crittenden | |
| 2013/0085053 A1 | | 4/2013 | Figiel et al. | |

OTHER PUBLICATIONS

International Preliminary Report on Patentability issued by ISA/EPO in connection with PCT/US2015/026655 dated Nov. 24, 2016.

\* cited by examiner

REDUCED POWER CONSUMPTION SEALING TOOL FOR STRAP

CROSS-REFERENCE TO RELATED APPLICATION DATA

This application claims the benefit of and prior to U.S. Provisional patent application Ser. No. 61/991,808, filed May 12, 2014.

BACKGROUND

Strap sealers are well known and provide positive sealing action of overlapping courses of strap material. These sealers interlock overlapping courses of a strap into a high strength joint in a notch-type seal or a crimp seal. In notch-type sealers, jaws cut into the seal and the outer edges of the strap, turning tabs down (down notch) or up (reverse notch). In a crimp-type sealer, the edges of the strap and the seal are pressed together into wavy crimps especially shaped to produce maximum frictional forces on the strap.

Powered strap sealers are known. One type of powered sealer uses a pneumatic cylinder to actuate a pair of jaws that close onto the strap or the crimp seal. One such pneumatic sealer is disclosed in Crittenden, U.S. Pat. No. 6,422,272. While the pneumatic sealer functions well for creating strap seals, it requires a source of compressed air and thus, hoses to supply the air to the sealer. As such, its use is limited in that it cannot be easily moved around a work space, yard or the like.

A battery powered sealer is disclosed in Figiel, US Publication 2013/0085053. This sealer overcomes some of the drawbacks of known powered sealers in that it allows for remote use and is readily moved around a work space. However, as with any battery powered tool, the operating life of the tool between battery changes or charges, is related to the power required to form the seal and is limited by the battery capacity.

The joint is the weakest part of the strapping system, therefore the type of joining method used is very important if strength is an issue. The strength of a joint is defined as the force required to break the strap in uniaxial tension. This is then compared to the uniaxial strength of the strap and recorded as the percent difference (e.g., a sample of strap may have a 5,000 lb (2,300 kg) break strength and the seal may fail at 3,750 lbs. (1,750 kg), so the seal is said to have a 75% strength).

Figure 1A:
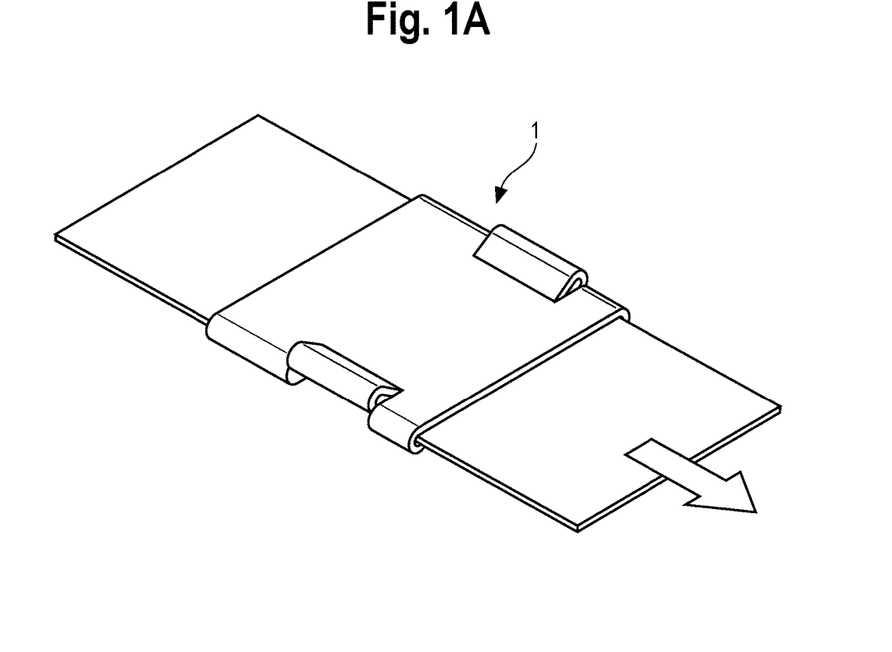
FIGS. 1A and 1B illustrate single and double notch seals, respectively, formed in a section of strap.
Figure 1B:
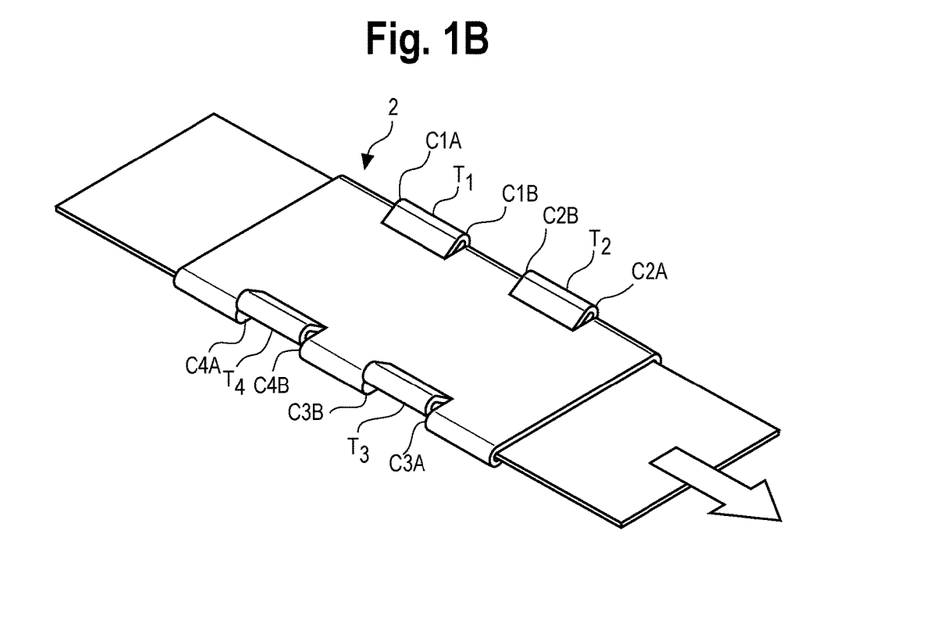

Single notch (two tabs, one on each side of the joint) joint strength is rated for a minimum of 45% of strap strength. Double notch (four tabs, two on each side of the joint) joint strength is rated for a minimum of 75% of strap strength. Illustrations of single notch 1 and double notch 2 joints are shown in FIGS. 1 and 2, respectively. Failure of single notch joints 1 is typically by pull through of the strap S from the joint 1. Failure of double notch joints is typically by pull through or strap S failure at the joint 1, 2. Pull though results when the strap S pulls though the seal tabs 3. Strap breakage occurs at the first weakest cross-section of the strap, for example, at the first notch. Double notch joints 2 require a balancing of distributing and holding the pulling force on the strap S against maintaining a minimum of 75% of the original cross-section of the strap S (and thus 75% strength).

Accordingly, there is a need for a powered sealing tool that operates through a sealing cycle so as to reduce the amount of power required to form the seal. Desirably, such a tool creates a seal that maintains a minimum of 75% of the original cross-section of the strap. More desirably, such a tool creates a double notch seal in a single operating cycle of the tool.

SUMMARY

A sealing tool for forming a joint in a seal positioned on overlying courses of strap includes a body, a motor and drive train housed, at least in part, in the body, a power supply and a sealing assembly mounted to the body. The sealing tool is configured to form a joint in overlapping sections of strap material. The sections of strap material are secured to one another by a seal. In forming the joint, opposing tabs are formed in the seal and strap by pairs of jaw elements in the sealing tool. The tabs are cut and are bent, relative to the seal and strap, to prevent pull-through of the strap from the seal. In forming the joint, the seal and straps are cut a predetermined distance into the into the strap from the edges of the strap.

The sealing assembly is operably coupled to the motor. The sealing assembly includes at least one jaw having a pair of opposing jaw elements. Each jaw element has two edges for cutting into the seal and the courses of strap and forming the bent tab. The jaw element edges are configured to cut into the seal and the courses of strap material at different distances into a width of the seal and strap.

In an embodiment, the sealing tool includes two jaws adjacent one another and an inboard notcher positioned between and operably connecting the jaws. The inboard notcher has a contact portion on which the seal is positioned when the jaw elements cut into the seal and strap. In an embodiment, the sealing tool includes notchers positioned outboard of each of the jaws. The outboard notchers include contact portions. In this embodiment, the jaw element edges nearer to the notcher form a first cut into the seal a distance greater than a second cut formed by the jaw element edges farther from the notcher.

The first cut is formed so as to maintain at least about 75% of the width of the strap intact between the cuts, and in an embodiment, so as to maintain about 79% to 82% of the width of the strap intact between the cuts. The second cut is formed so as to maintain at least about 90% of the width of the strap intact between the cuts.

The inboard notcher contact portion is at a different height than a height of the outboard notcher contact portions. The height of the inboard notcher contact surface is elevated relative to the height of the outboard notcher contact surfaces. The heights of the outboard notcher contact portions are about equal.

In an embodiment, a sealing tool for forming a joint in a seal positioned on overlying courses of strap includes a motor and drive train. The drive train includes a final drive gear. A power supply is operably coupled to the motor and a sealing assembly includes a sealing assembly gear, an over-run clutch operably connected to the sealing assembly gear and a pair of jaw elements operably connected to the over-run clutch. The over-run clutch is configured to engage the motor to drive the jaw elements from an open position to a closed position to form the joint in the seal and courses of strapping material and to disengage the motor from the jaw elements as the jaw elements move from the closed position to an open position.

The over-run clutch can be positioned in an inner periphery of the sealing assembly gear. The inner periphery of the sealing assembly gear and the over-run clutch can include cooperating pawls and recesses to engage and disengage the over-run clutch from the motor. The pawls can be pivoting pawls and the over-run clutch can include the plurality of pivoting pawls that engage the plurality of recesses in the inner periphery of the sealing assembly gear.

In an embodiment, a sealing tool for forming a joint in a seal positioned on overlying courses of strap, includes a body, a motor and drive train housed, at least in part, in the body, a power supply and a sealing assembly mounted to the body and operably coupled to the motor. The sealing assembly can include at least one jaw having a pair of opposing jaw elements. Each jaw element has two edges for cutting into the seal and the courses of strap and forming a bent tab. The jaw element edges are configured to cut into the seal and the courses of strap material at different distances into a width of the seal and strap material.

The sealing assembly can include two jaws adjacent one another and separated by a notcher. The jaw element edges nearer to the notcher cut into the seal forming a first cut at a lesser distance than a second cut formed by the jaw element edges farther from the notcher. The first cut can be formed so as to maintain at least about 75% of the width of the strap intact between the cuts and can be formed so as to maintain about 79% to 82% of the width of the strap intact between the cuts. The second cut can be formed so as to maintain at least about 90% of the width of the strap intact between the cuts.

An embodiment of a sealing tool for forming a joint in a seal positioned on overlying courses of strap includes a body, a motor and drive train housed, at least in part, in the body, a power supply and sealing assembly mounted to the body and operably coupled to the motor for operating the sealing tool through a notching cycle. The sealing assembly can include at least one jaw having a pair of opposing jaw elements. Each jaw element has two edges for cutting into the seal and the courses of strap to form a bent tab. The jaw element edges are configured to cut into the seal at different times during the notching cycle.

The sealing assembly can include two jaws adjacent to one another and separated by a notcher. The jaw element edges farther from the notcher cut into the seal forming a cut prior to the jaw element edges nearer to the notcher.

In an embodiment, a sealing tool for forming a joint in a seal positioned on overlying courses of strap includes a motor and drive train, a power supply operably coupled to the motor and a sealing assembly operably coupled to the motor by the drive train. The sealing assembly includes at least one jaw having a pair of opposing jaw elements. The jaw elements are mounted to and spaced from each other by at least one notcher. The sealing tool further includes a controller, an actuation switch and a sensor. The sensor is mounted to the sealing assembly, between the opposing jaw elements and adjacent to the at least one notcher. The sensor is biasedly mounted to the sealing assembly so as to move toward and away from notcher. The sensor senses the presence or absence of a seal on the sensor and between the jaw elements. The sensor can be pivotally mounted to the sealing assembly. The sensor can be an induction sensor. Upon sensing the presence of a seal, the sensor generates a signal to the controller and the controller generates a signal to permit actuation of the motor.

A method for forming a joint in a seal positioned on overlying courses of strap includes positioning the seal between opposing jaw elements of a jaw, each jaw element including two cutting edges, closing the jaw elements onto the seal and asymmetrically cutting the seal at the jaw element edges to form cuts into the seal at different distances into a width of the seal and to form a tab in the seal and strap.

The method can further include the jaw being a first jaw such that the opposing jaw elements of the first jaw are first jaw elements and including second opposing jaw elements of a second jaw adjacent to the first jaw and separated therefrom by an inboard notcher. The inboard notcher has a contact portion and each jaw element includes two cutting edges. The method includes closing the first and second jaw elements onto the seal such that the first jaw asymmetrically cuts the seal at the jaw element edges to form cuts into the seal at different distances into a width of the seal and to form a tab in the seal and strap and the second jaw asymmetrically cuts the seal at the second jaw element edges to form second cuts into the seal. One of the first cuts and one of the second cuts is at a same distance into a width of the strap and the other of the first cuts and the other of the second cuts is at a same distance into a width of the strap, the first cuts and the second cuts being at different distances into the width of the strap.

The method can further include outboard notchers on outer sides of the jaws such that the outboard notchers have contact portions on which the seal is positioned when the jaw elements cut into the seal and strap.

The first cuts can be formed so as to maintain at least about 75% of the width of the strap intact between the cuts and so as to maintain about 79% to 82% of the width of the strap intact between the cuts. The second cuts can be formed so as to maintain at least about 90% of the width of the strap intact between the cuts.

In a method, the inboard notcher contact portions can be at a different height than a height of the outboard notcher contact portion, and the height of the inboard notcher contact portion can be elevated relative to the heights of the outboard notcher contact portion. The heights of the outboard notcher contact portions can be about equal.

A seal formed in overlying course of strap includes a seal element positioned around the overlying course of strap material. The seal element includes a pair of opposing tabs formed therein. Each tab is formed by respective first and second cuts on a same side of the seal. The first cuts and the second cuts are cut into the seal different distances from an edge of the seal.

Other objects, features, and advantages of the disclosure will be apparent from the following description, taken in conjunction with the accompanying sheets of drawings, wherein like numerals refer to like parts, elements, components, steps, and processes.

DESCRIPTION OF THE DRAWINGS

FIGS. 8A-8D are illustrations of the various components of the sealing assembly as it moves through a sealing cycle, in which FIG. 8A shows the assembly in position to receive a seal, FIG. 8B shows the assembly in a position as the jaw elements begin to close onto a seal, FIG. 8C shows the jaw elements in a position just prior to closing onto the seal, and FIG. 8D shows the jaw elements returning to the open position;

DETAILED DESCRIPTION

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 2:
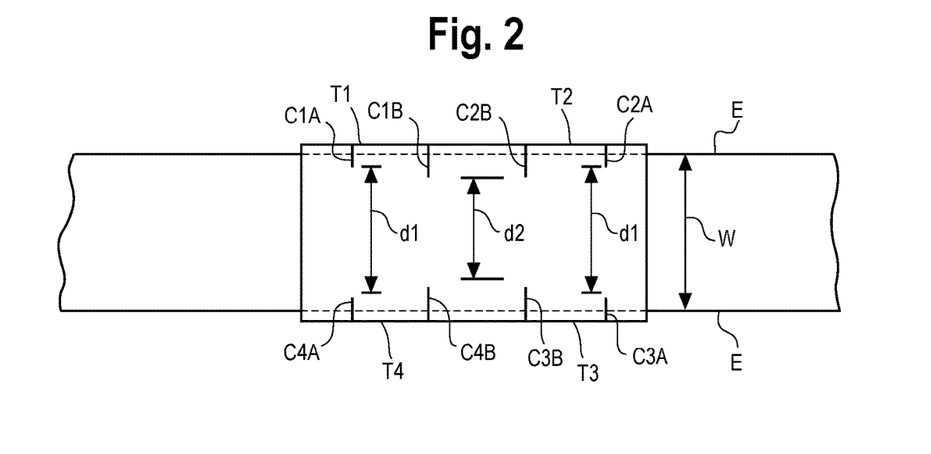
FIG. 2 is a graphical illustration of a joint formed with an embodiment of a reduced power consumption sealing tool for strap, showing the relative depth of cuts into the width of the strap using the sealing tool.
Figure 3:
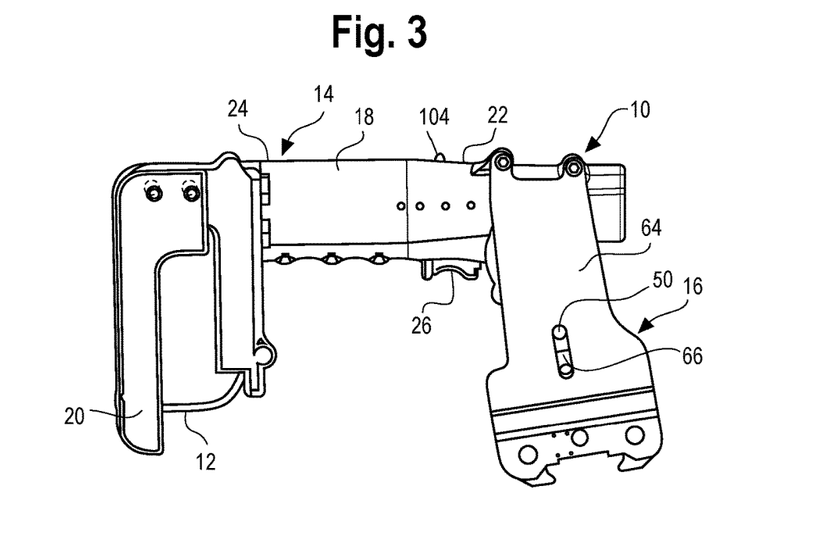
FIG. 3 is front view of an example embodiment of the sealing tool.

FIG. 3 illustrates an embodiment of a sealing tool 10. The sealing tool 10 is configured to form a joint 1,2 as seen in FIGS. 1A, 1B and 2, in overlapping sections of strap S material, around a load, which sections of strap S material are secured to one another by a seal L. In reference to the double notch joint 2 of FIGS. 1B and 2, in forming the joint 2, opposing tabs T1-T4 are formed in the seal L and strap S by each pair of jaws, which is discussed in detail below. Cuts C1A-4B are made in the seal L and strap S and the tabs T1-T4 are bent, relative to the seal L and strap S to prevent pull-through of the strap S from the seal L. In forming the joint 2, the seal L and straps S are cut a predetermined distance into the into the strap S from the edges E of the strap S.

The tool 10 includes a power supply 12, a body 14 and a sealing assembly 16. In one embodiment, the body 14 includes a handle 18 and a receiver 20. The body 14 can be manufactured from strong, but lightweight materials including, but not limited to, plastics, metals, or any other light weight material.

The power supply 12 can be a lithium-ion or nickel cadmium battery having an operational voltage of about 14.4 to 24 volts inclusive. Batteries of other operating voltages are contemplated for use with the tool 10. The battery 12 is removably secured in the receiver 20. A lock or retainer (not shown) can secure the battery 12 in place in the receiver 20.

As shown in FIG. 3, the body 14 includes a first end 22 at which the sealing assembly 16 is mounted and a second end 24 at which the receiver 20 is formed. The handle 18 is formed between the first and second ends 22, 24. An actuating switch 26 is position on the body 14 at about the handle 18 for operating the tool 10.

Figure 4:
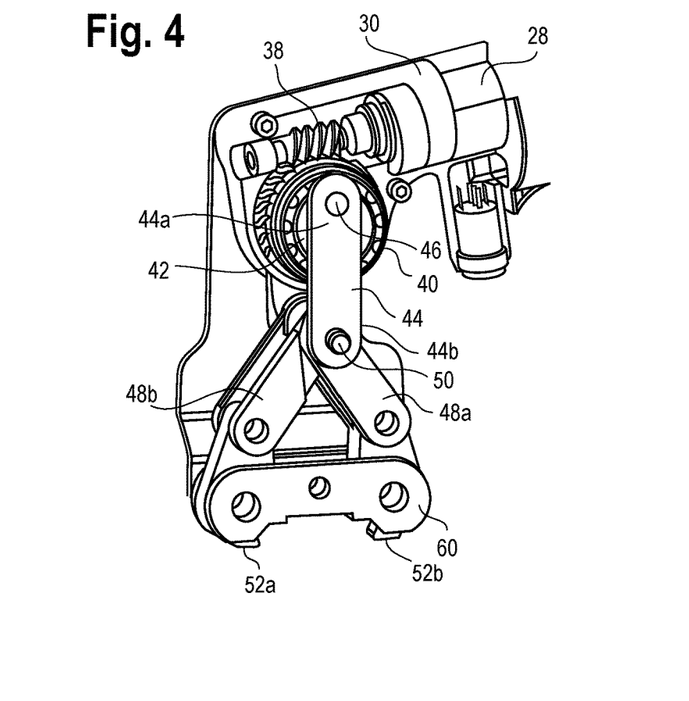
FIG. 4 is a perspective view of the sealing assembly of the tool with the side plates removed for clarity of illustration.
Figure 5:
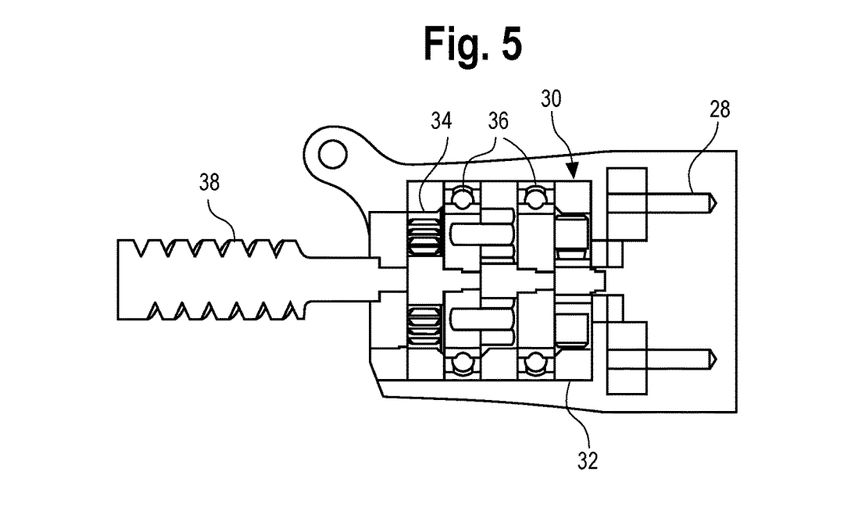
FIG. 5 is a schematic illustration of the motor and drive train.
Figure 6:
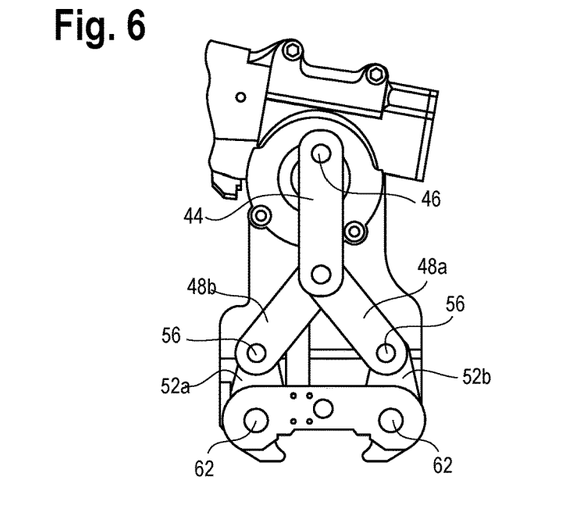
FIG. 6 is a front view of the sealing assembly.

Referring to FIGS. 4 and 5, a motor 28 and drive train 30 are positioned, at least in part in the body 14. The drive train 30 includes a gear set 32. In an embodiment, the gear set 32 can include a planetary gear set 34, one or more bearings 36 and a final drive gear 38. The final drive gear 38 can be a linear output or worm gear. The planetary gear set 34 reduces the output speed and increases the output power or torque of the motor 28 as it drives the final drive gear 38.

Figure 7A:
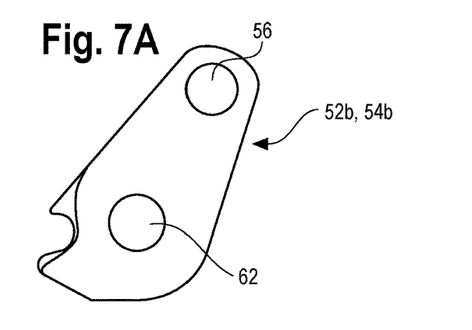
FIGS. 7A and 7B are front views of a jaw element and a notcher, respectively.
Figure 14:
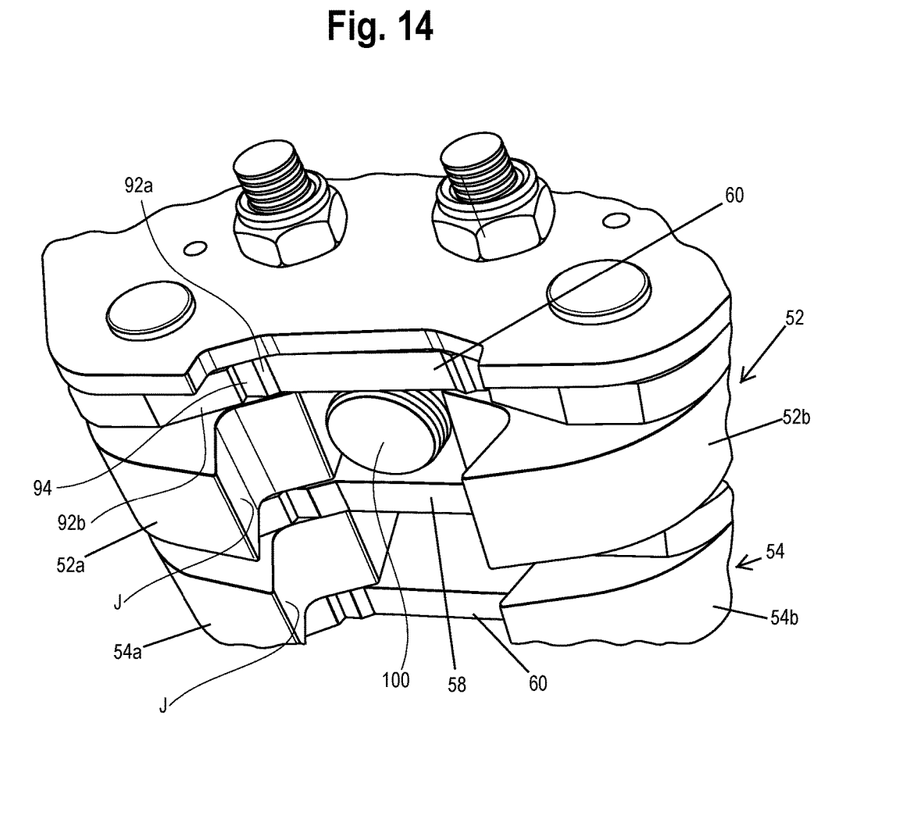
FIG. 14 is a bottom perspective view of the jaws, notchers and sensor of an embodiment of the sealer.
Figure 15:
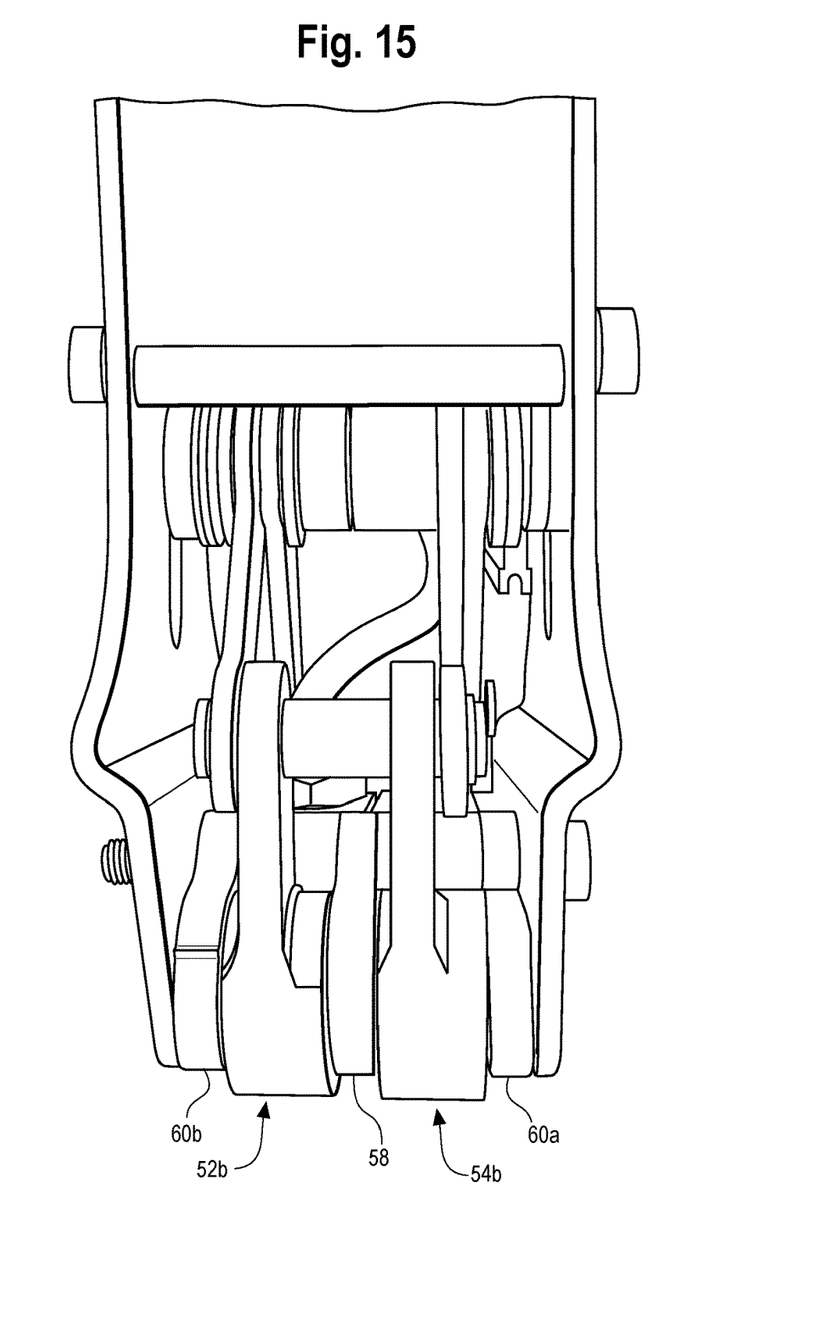
FIG. 15 is side view of the sealing assembly.

The sealing assembly 16 is mounted at the first end 22 of the body 14 and is operably connected to the final drive gear 38. The sealing assembly 16 includes a sealing assembly drive gear 40 (referred to as the sealing assembly gear) and an over-run clutch 42 operably mounted to the sealing assembly gear 40. A first link 44 is eccentrically mounted to the over-run clutch 42 by a first pin 46. A pair of link arms 48a,b are pivotally mounted to the first link 44 by a second pin 50. The assembly 16 includes at least one and may include multiple jaws 52, 54, each including jaw elements 52a,b and 54a,b, an example of which is shown in FIGS. 7A and 14. Each jaw 52, 54 includes opposing or facing jaw elements 52a,b and 54a,b and each jaw element 52a, 52b, 54a, 54b, is pivotally mounted to a respective link arm 48a,b by respective third pins 56. The jaw elements 52a,b of jaw 52 are positioned on opposite sides of the strap path and rotate to form opposing notches in the strap S. Jaw elements 52a,b and jaw elements 54a,b form a pair of opposing tabs T1-T4 in the seal L and strap S, and each tab T1-T4 requires two cuts C1A-C4B, one on each side of a respective tab T1-T4.

Figure 7B:
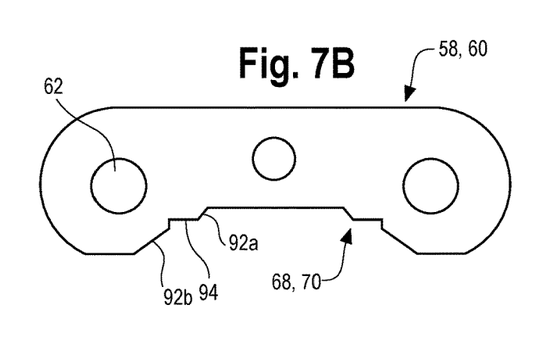

The jaw elements 52a,b and 54a,b are mounted to, and operably connected to each other, by notchers 58, 60, an example of which is shown in FIG. 7B. The jaw elements 52a,b and 54a,b are mounted to the notchers 58, 60 by respective fourth pins 62. In this configuration, as the sealing assembly gear 40 rotates, it rotates the over-run clutch 42. A first end 44a of the first link 44 rotates with the overrun clutch 42 which in turn moves a second end 44b of the first link 44 in a generally reciprocating manner. The link arms 48, which are mounted pivotally to the second end 44b of the first link 44, move in a generally downward and outward arc, which in turn opens and closes the jaws 52, 54.

Referring to FIG. 3, in an embodiment, the sealing assembly 16 includes a pair of side plates 64 that contain the sealing assembly gear 40 and clutch 42, the jaw elements 52a,b and 54a,b, the first link 44 and link arms 48a,b and the notchers 58, 60. The side plates 64 can also include a slotted opening 66 and the second pin 50 can extend through the opening 66 to guide the second end 44b of the first link 44 and the first ends of the link arms 48a,b in a reciprocating path as the tool 10 moves through the cycle.

As noted previously, one drawback of battery powered tools generally is that the operating life of the tool, between battery changes or charges, is related to the power required to perform the tool's function and the battery capacity. In order to address this in a powered sealer, given current constraints on battery capacity, the peak power required to form the seal and the power required for the tool to operate through the cycle can be reduced.

Figure 12:
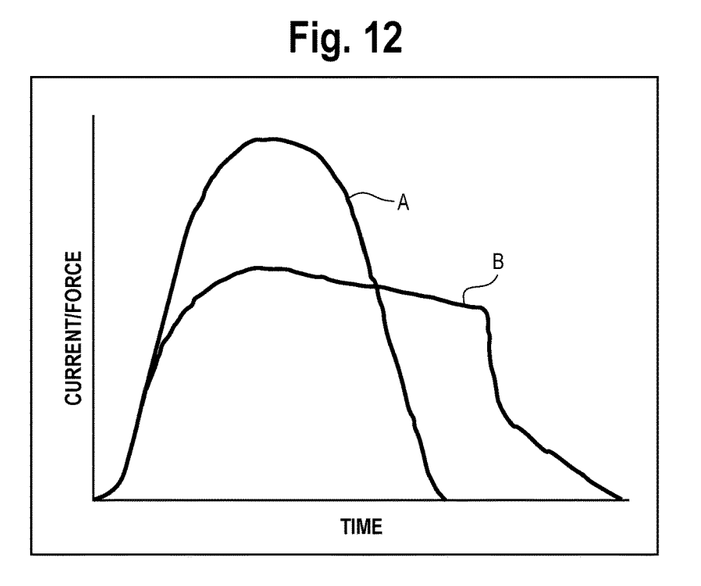
FIG. 12 is a graphical representation of the current/force vs. time curve for a conventional notch arrangement in which the cuts are made simultaneously (curve A) and a reduced power configuration in which the cuts are made sequentially or with a second cut made after the first cut is initiated (curve B)
Figure 13:
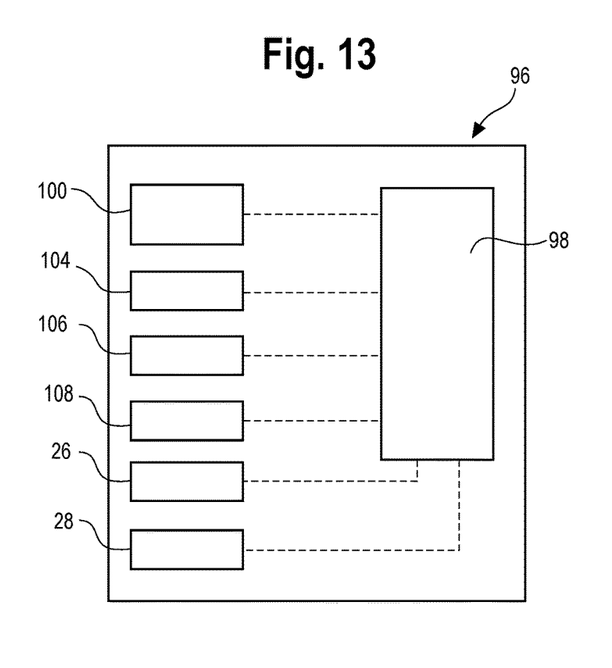
FIG. 13 is a schematic illustration of an example of a control system for the sealer.

It will be appreciated that peak power is required to initiate the cutting of the seal and strap to form the tabs. As illustrated in FIG. 12, which shows a curve of power against time or stroke, peak power is seen as the jaws initiate the cuts into the seal and strap. Because there are two cuts per tab, the power required is essentially double the power required for each cut, as indicated at curve A. In order to reduce the peak power required to form the cuts, in an embodiment, the cuts C1A-C4B into the seal L and strap S are staggered so that contact with and cutting of the seal and strap is at different times in the cycle. As seen in FIG. 2, this provides for one of the jaw edges, for example, an outer edge of the jaw, forming a shallower (a lesser distance d1 across the width W of the strap S and seal L) cut for example, cut C1A into the seal L and strap S. As illustrated in curve B in FIG. 12, this configuration reduces the peak power required by shifting one of the initial cuts (and thus the power required to form the cut) to a slight later time in the cycle, and reduces the overall power required by less cutting into the seal and strap.

In an embodiment, the deeper inner cuts C1B-C4B are formed by elevating an inner portion of the seal L relative to the jaws 52, 54 as the jaws 52, 54 close on the seal L. As seen in FIG. 14, in a sealer 10 in which there are two jaws 52, 54, there is an inboard notcher 58 between the jaws 52, 54 and outboard notchers 60 at the outside of each jaw 52 and 54 or at outboard positions. The inboard notcher 58 has a higher contact portion 68, which is the location on which the seal L rests as it is cut, than the contact portion 70 of the outboard notchers 60a,b. In this manner, the center portion of the seal L will be cut first, as the contact portion 68 is closer to the jaws 52, 54 closing on the seal L. This affects both first contact at the inboard notcher 58, as well as deeper cuts C1B-C4B at the jaw element edges J adjacent to the inboard notcher 58.

Additionally, again referring to FIG. 2, in an embodiment, the jaws are configured so that the first or outer (shallower) cuts C1A-C4A are made so as to preserve about 90% of the cross-section (as indicated at d1) of the strap S and the second or inner (deeper) cuts C1B-C4B are made so as to preserve at least about 75% and preferably about 79% to 82% of the cross-section (as indicated at d2) of the strap S. It has been observed that this cutting arrangement maintains the joint strength at at least 75% to prevent strap breakage at the joint and also provides sufficient material at the tabs to prevent strap pull through. The outer, shallower cuts C1A-C4A will absorb some of the stresses that would otherwise be imposed on the deeper, inner cuts C1B-C4B so that the joint 2 strength is maintained.

Figure 9A:
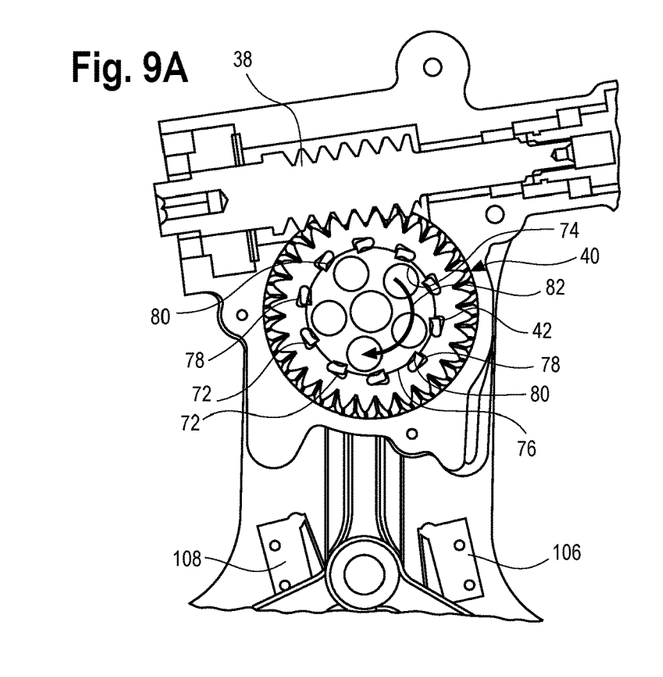
FIGS. 9A and 9B illustrate the over-run clutch in the drive condition, driving the jaw elements closed onto a seal with the clutch engaged, and returning to the home position with the seal driving the jaw elements open with the clutch disengaged, respectively.
Figure 9B:
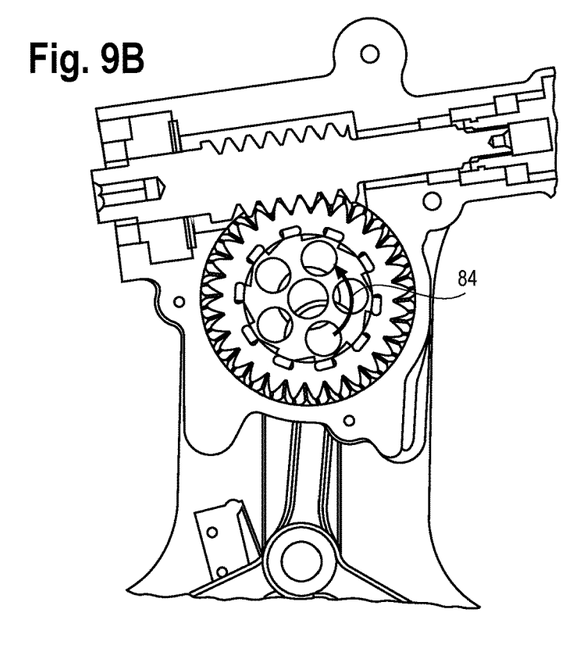

Referring now to FIGS. 4 and 9A and 9B, in an embodiment, the over-run clutch 42 provides another feature that facilitates the reduction of power usage, as well as wear on the sealing tool 10. As noted previously, the final drive gear 38 meshes with the sealing assembly gear 40 to drive the jaws 52, 54 through the sealing cycle. As also noted previously, peak power consumption, which correlates to a point of maximum stresses induced on the sealing assembly gear 40, occurs as the jaws 52, 54 begin to cut into the seal L and strap S. This results in a point or location of increased wear on the sealing assembly gear 40 where it meshes with the final drive gear 38 as the jaws 52, 54 commence cutting. When the connection between the sealing assembly gear 40 and first link 44 is fixed, this results in the highest stresses and wear on the sealing assembly gear 40 at the same location for every sealing cycle. This also requires power to the tool 10 to drive the jaws 52, 54 when returning the sealer 10 to an open position following the sealing cycle.

The over-run clutch 42 is operably connected to the sealing assembly gear 40 and to the first link 44 and applies a driving force to the first link 44 during the sealing cycle as the jaws 52, 54 close onto and cut the seal L and strap S, and permits the clutch 42 (and thus the first link 44) to slip relative to the sealing assembly gear 40 after the joint 2 is made and as the jaws 52, 54 return to the open position. The sealing assembly gear 40 includes a plurality of biased pawls 72 that pivot and extend inwardly from an interior periphery 74 of the gear 40. The over-run clutch 42 includes a bearing portion 76 that rides in the inner periphery 74 of the sealing assembly gear 40 and includes a plurality of recesses 78 that cooperate with the pawls 72. The pawls 72 are ramped, as indicated at 80, so that the clutch 42 engages the sealing assembly gear 40 in one direction, the driving direction, as indicated by the arrow at 82 (with the pawls 72 biased into the recesses 78), but also so that the clutch 42 slips over (by pivoting the pawls 72 inwardly) when the clutch 42 runs in an opposite direction as indicated by the arrow at 84 (when the jaws 52, 54 drive the clutch 42 to the open position, rather than the clutch 42 driving the jaws 52, 54).

The over-run clutch 42 provides a number of improved features. First, because the clutch 42 slips relative to the sealing assembly gear 40, the sealing assembly gear 40 meshes with the final drive gear 38 at different locations along the sealing assembly gear 40 periphery. This varies the location on the sealing assembly gear 40 periphery where maximum stresses are induced. This also results in less localized wear on the sealing assembly gear 40, again, by varying the location on the sealing assembly gear 40 periphery where it meshes with the final drive gear 38. In addition, the over-run clutch 42 eliminates the need to drive the jaws 52, 54 open, further reducing the power demand on the battery 12.

Figure 10:
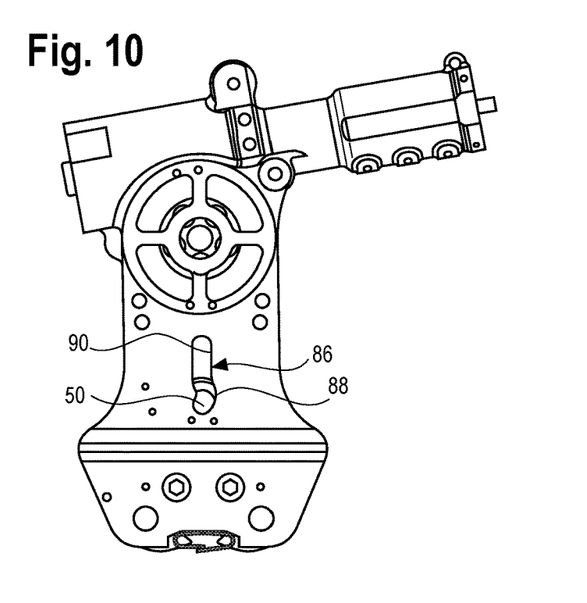
FIG. 10 is a side view of an embodiment of the sealer showing a pin slot with a curved lower portion.

In an embodiment, the sealing tool 10 may also include a time-elongated cycle. Lengthening or extending the time over which the jaws 52, 54 cut into the seal L and strap S can also reduce the peak power required. Referring to FIG. 12, in that the peak power consumed is a function of the energy required to cut the seal L and strap S over a period of time, by extending the cutting time, the peak power is reduced while the total power consumed remains fairly constant. Referring to FIG. 10, one way in which this is accomplished is by reducing or slowing the time over which the jaws 52, 54 close on the seal L and strap S. In an embodiment, this is carried out by providing a non-linear travel path 86 for the second pin 50 that operably connects the first link 44 to the link arms 48a,b. The travel path 86 can be formed having a slightly curved or arcuate lower section 88. In an embodiment, the travel path 86 is provided by a notched opening 90 in the side plate 64 through which the pin 50 travels that is arcuate or slightly curved at the lower section 88 of the opening 90. This in effect lengthens the time over which the jaws 52, 54 close on the seal L and strap S, and serves to stagger the times at which the jaws 52, 54 close on the seal L and strap S, further reducing the peak power requirement to form the joint 2.

Still additional power savings can be recognized by the position of the seal L within the tool 10 relative to the jaws 52, 54 closing on the seal L and strap S. In an embodiment, as seen in FIG. 7B, the notchers 58, 60 are formed with ramps 92a,b and steps 94, elevated from the bottom wall on which the seal L is positioned during the cutting cycle (see, for example, FIG. 11A). This allows for a maximum application of a normal force to form the cuts C1A-C4B. As seen in FIG. 14, it will be appreciated from a study of the figures that the contact portions 68 on the inboard notcher 58 are higher than the contact portions 70 on the outboard notchers 60.

Figure 11A:
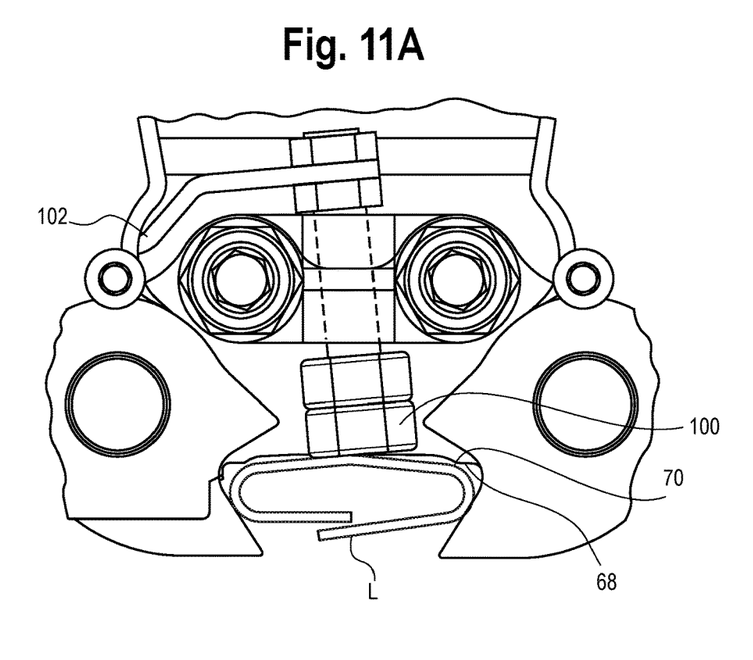
FIG. 11A is a partial, enlarged view of the jaw elements and notcher, illustrating notcher ramped walls, and also illustrating the spring biased seal sensor.
Figure 11B:
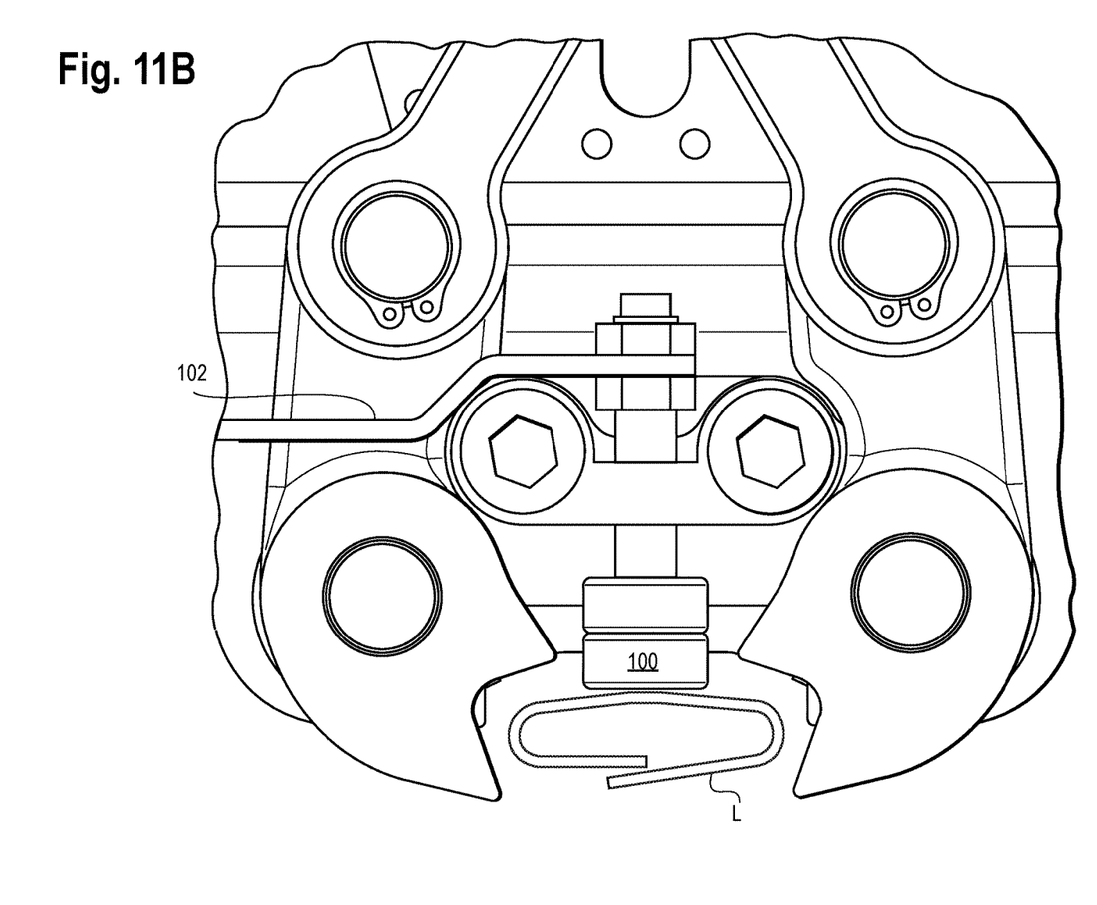
FIG. 11B is a view of the sensor showing the pivoting mount on the sealing assembly.

Referring to FIGS. 11A and B, 13 and 14, in an embodiment, the sealer includes a control system 96 to control the overall operation of the sealing tool 10. The control system 96 can include a controller 98, the actuating switch 26 and one or more sensors 100. The control system 96 may also be operably connected to one or more indicators 104, for example one or more LEDs, on the tool 10 to indicate various states of readiness and/or operation. The controller 98 can be configured to control operation of the motor 28 to ensure that the motor 28 actuates when a seal L is sensed properly positioned in the jaws 52, 54. In an embodiment, the sealer 10 includes a sensor 100, such as a proximity sensor positioned jaw elements (for example, between the jaw elements 52a and 52b), and between notchers. The sensor 100 senses the presence or absence of a seal L that is properly positioned in the jaws 52, 54 and permits the tool 10 to actuate (permits the motor 28 to run), only when it senses the presence of the seal L. An indicator, such as an LED on the tool 10 can indicate that the sensor 100 senses the presence of a seal L in the tool 10.

Proximity sensors are typically sensitive devices and unless a near perfect detection is sensed, the sensor will not allow a desired operation. In the context of the sealer, unless the seal is perfectly or near perfectly positioned in the jaws and sensed by the sensor, the control system does not receive a signal to permit the motor to actuate. This can be exacerbated by the fact that the seals may not have flat bottom walls. That is, the seals may be formed with bent bottom walls during the manufacturing process.

In an embodiment of the sealing tool 10, the sensor 100 is mounted to the sealing assembly 16 to permit movement of the sensor 100 relative to the jaw elements 52a,b. That is, rather than being fixed between the jaw elements 52a,b, the sensor 100 can move to accommodate a seal L that may not be perfectly positioned in the jaw elements 52a,b, but is sufficiently positioned such that the jaw elements 52a,b will close on the seal L and form a proper joint 2. The sensor "float" also accommodates seals L that may not be flat on the face of the seal L that seats in the jaw 52 and is positioned on the notchers 58, 60. Again, such a non-flat or non-planar face could also not allow the sensor 100 to generate the proper signal to permit the sealer 10 to operate.

In an embodiment, the sensor 100 is mounted to an arm 102 that spring biases the sensor 100 toward the seal L. As the sensor arm 102 is urged inwardly, toward the sealer body 14 (away from the jaw 52), there is sufficient contact between the seal L and the sensor 100 such that a signal is generated to permit the motor 28 to cycle and the jaws 52, 54 to close. An exemplary sensor 100 is an inductive sensor.

Additional sensors and/or switches can be included to assure the tool 10 is in one or more proper positions. For example, home position switches 106 and 108 can be used to determine whether the jaws 52, 54 are in the home position during operation and between operating cycles.

Figure 8A:
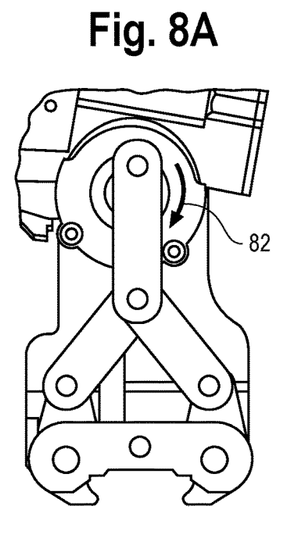
Figure 8B:
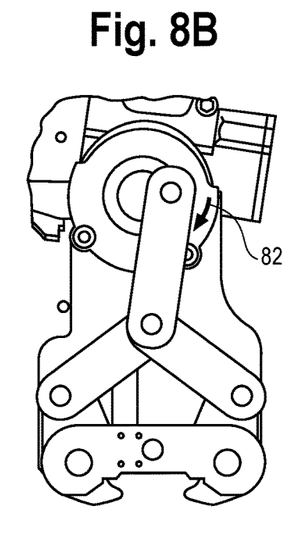
Figure 8C:
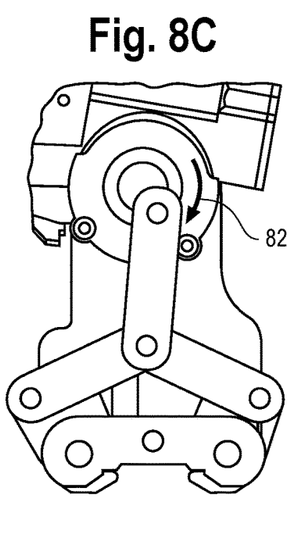
Figure 8D:
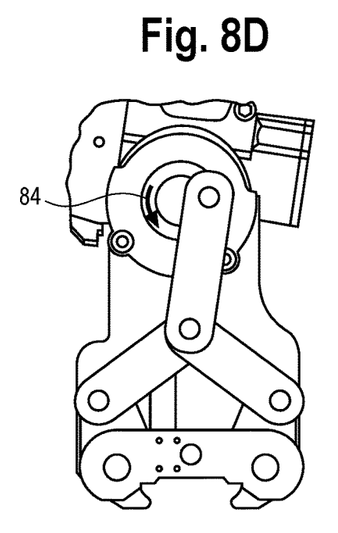

It will be appreciated that a variety of additional programming steps can be provided in the control system 96. For example, the control system 96 can be configured or programmed to ensure that the tool 10 returns to the home position (the jaw elements 52a,b and 54a,b are open, as illustrated in FIG. 8A), regardless of whether the tool 10 is cycled with or without a seal L or strap S in place in the tool.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

What is claimed is:

1. A sealing tool for forming a joint in a seal positioned on overlying courses of strap, comprising:
   a drive train;
   a motor operably connected to the drive train;
   a power supply operably connected to the motor;
   a sealing assembly to which the motor is operably connected via the drive train, the sealing assembly including;
   a first jaw having a first jaw element and an opposing second jaw element, the first and second jaw elements each having first and second cutting edges;
   a second jaw adjacent to the first jaw and having a first jaw element and an opposing second jaw element, the first and second jaw elements each having first and second cutting edges;
   a first outboard notcher positioned outboard of the first jaw and including a first contact portion;
   a second outboard notcher positioned outboard of the second jaw and including a second contact portion; and
   an inboard notcher positioned between the first jaw and second jaws and having a contact portion,
   wherein the contact portion of the inboard notcher is at a different height than heights of the first and second contact portions of the first and second outboard notchers.

2. The sealing tool of claim 1, wherein the first cutting edges of the first and second jaw elements are nearer to the inboard notcher than the second cutting edges of the first and second jaw elements.

3. The sealing tool of claim 1, wherein the height of the contact portion of the inboard notcher is elevated relative to the heights of the first and second contact portions of the first and second outboard notchers.

4. The sealing tool of claim 3 wherein the heights of the first and second contact portions of the first and second the outboard notchers are about equal.

5. A sealing tool for forming a joint in a seal positioned on overlying courses of strap material, the sealing tool comprising:
   a motor;
   a drive train;
   a power supply operably connected to the motor;
   a sealing assembly to which the motor is operably connected via the drive train, the sealing assembly including a first jaw having first and second opposing jaw elements, each jaw element having a first cutting edge and a second cutting edge, the sealing assembly further including a second jaw having first and second opposing jaw elements, each jaw element having a first cutting edge and a second cutting edge;
   an inboard notcher between the first jaw and the second jaw, the inboard notcher having a contact portion;
   a first outboard notcher outboard of the first jaw, the first outboard notcher having a contact portion; and
   a second outboard notcher outboard of the second jaw, the second outboard notcher having a contact portion,
   wherein the contact portion of the inboard notcher is at different height than heights of the first and second contact portions of the first and second outboard notchers, and
   wherein the motor is operably connected to the sealing assembly to cause the first and second jaw elements to move to, for each jaw element, cause the first cutting edge of that jaw element to cut a first distance into a width of the seal and widths of the overlying courses of strap material and cause the second cutting edge of that jaw element to cut a second different distance into the width of the seal and the widths of the overlying courses of strap material to form a bent tab.

6. The sealing tool of claim 5, wherein the first cuts are formed so as to maintain at least about 75% of the widths of the overlying courses of strap material intact between the first cuts.

7. The sealing tool of claim 6, wherein the first cuts are formed so as to maintain about 79% to 82% of the widths of the overlying curses of strap material intact between the first cuts.

8. The sealing tool of claim 7, wherein the second cuts are formed so as to maintain at least about 90% of the widths of the overlying courses of strap material intact between the second cuts.

9. A method for forming a joint in a seal positioned on overlying courses of strap material, the method comprising:
    positioning the seal between opposing first jaw elements of a first jaw and between opposing jaw elements of a second jaw, each first jaw element and each second jaw element including two cutting edges; and
    closing the first jaw elements and the second jaw elements onto the seal to cause;
    the seal to contact a contact portion of an inboard notcher between the first and second jaws and to contact contact portions of outboard notchers on outer sides of the first and second jaws, wherein the contact portion of the inboard notcher is at a different height than heights of the contact portions of the outboard notchers,
    for each first jaw element, the cutting edges of that first jaw element to asymmetrically cut into a width of the seal and into widths of the overlying courses of strap material at different distances to form a bent tab; and
    for each second jaw element, the cutting edges of that second jaw element to asymmetrically cut into a width of the seal and into widths of the overlying courses of strap material at different distances to form a bent tab,
    wherein each first jaw element and each second jaw element forms a first cut that extends a first distance into the width of the seal and into widths of the overlying course of strap material and a second cut the extends a different distance in the width of the seal and into widths of the overlying courses of strap material.

10. The method of claim 9, wherein the first cuts are formed so as to maintain at least about 75% of the widths of the overlying courses of strap material intact between the first cuts.

11. The method of claim 10, wherein the first cuts are formed so as to maintain about 79% to 82% of the widths of the overlying courses of strap material intact between the first cuts.

12. The method of claim 9, wherein the second cuts are formed so as to maintain at least about 90% of the widths of the overlying courses of strap material intact between the second cuts.

13. The method of claim 9, wherein the height of the contact portion of the inboard notcher is elevated relative to the heights of the contact portions of the outboard notcher.

14. The method of claim 13, wherein the heights of the contact portions of the outboard notchers are about equal.

* * * * *